United States Patent
Vacek et al.

(10) Patent No.: US 6,937,702 B1
(45) Date of Patent: Aug. 30, 2005

(54) METHOD, APPARATUS, AND COMPUTER READABLE MEDIA FOR MINIMIZING THE RISK OF FRAUDULENT ACCESS TO CALL CENTER RESOURCES

(75) Inventors: Jill M. Vacek, Blair, NE (US); Mark J. Pettay, Omaha, NE (US); Hendryanto Rilantono, Omaha, NE (US); Mahmood S. Akhwand, Omaha, NE (US); Gary L. West, Omaha, NE (US)

(73) Assignee: West Corporation, Omaha, NE (US)

( * ) Notice: Subject to any disclaimer, the term of this patent is extended or adjusted under 35 U.S.C. 154(b) by 382 days.

(21) Appl. No.: 10/178,798

(22) Filed: Jun. 24, 2002

Related U.S. Application Data (63) Continuation-in-part of application No. 10/156,444, filed on May 28, 2002, now Pat. No. 6,804,331.

(51) Int. Cl.$^7$ .......................... H04M 21/64; G10L 17/00
(52) U.S. Cl. ................... 379/88.02; 379/88.01; 379/88.17; 379/265.04; 379/266; 704/246; 704/247
(58) Field of Search ................ 379/88.02, 88.01, 379/265.04, 266.09, 88.04; 704/246, 247, 275; 382/115–118

(56) References Cited

U.S. PATENT DOCUMENTS

| | | | |
|---|---|---|---|
| 3,752,904 A | | 8/1973 | Waterbury |
| 4,752,676 A | | 6/1988 | Leonard et al. |
| 4,993,068 A | | 2/1991 | Piosenka et al. |
| 5,153,918 A | | 10/1992 | Tuai |
| 5,412,727 A | | 5/1995 | Drexler et al. |
| 5,414,755 A | | 5/1995 | Bahler |
| 5,513,250 A | | 4/1996 | McAllister |
| 5,517,558 A | * | 5/1996 | Schalk .................... 379/88.02 |
| 5,581,630 A | * | 12/1996 | Bonneau, Jr. ............... 382/116 |
| 5,608,784 A | * | 3/1997 | Miller ..................... 379/88.02 |
| 5,623,539 A | | 4/1997 | Bassenyemukasa |
| 5,634,086 A | | 5/1997 | Rtischev |
| 5,638,430 A | | 6/1997 | Hogan et al. |
| 5,666,157 A | | 9/1997 | Aviv |
| 5,819,029 A | | 10/1998 | Edwards |
| 5,838,768 A | | 11/1998 | Sumar |
| 5,862,325 A | | 1/1999 | Reed et al. |

(Continued)

OTHER PUBLICATIONS

VOICELOG, VoiceLog Announces Free Speech TPV—Speech Recognition–Based Verification At Touchtone Prices, Press Release, www.voicelog.com, Jan. 6, 2004.

(Continued)

*Primary Examiner*—Fan Tsang
*Assistant Examiner*—Simon P. Sing
(74) *Attorney, Agent, or Firm*—Rocco L. Adornato (57) ABSTRACT

Method, apparatus, and computer-readable media for minimizing the risk of fraudulent access to call center resources. The invention described herein provides a method of minimizing fraudulent access to call center resources, with the method including at least the following. One or more authenticated biometric samples are associated with at least one person. The person then submits at least one test biometric sample during a login process to obtain authorization to access to call center resources, for example, to process telephone calls or to receive training. This test biometric sample is captured and the differences between the test biometric sample and the one or more authenticated biometric samples is quantified. Depending on the degree of difference between the at least one authenticated biometric sample and the test biometric sample, the person's request for authorization to access call center resources is dispositioned. Apparatus and computer-readable media to realize the above functions are also provided herein.

24 Claims, 7 Drawing Sheets

U.S. PATENT DOCUMENTS

| | | | | | |
|---|---|---|---|---|---|
| 5,872,834 | A | * | 2/1999 | Teitelbaum | 379/93.03 |
| 5,884,262 | A | | 3/1999 | Wise et al. | |
| 5,903,225 | A | | 5/1999 | Schmitt et al. | |
| 5,915,001 | A | | 6/1999 | Uppaluru | |
| 5,940,476 | A | | 8/1999 | Morganstein | |
| 5,987,155 | A | | 11/1999 | Dunn et al. | |
| 6,011,858 | A | | 1/2000 | Stock et al. | |
| RE36,580 | E | | 2/2000 | Bogosian, Jr. | |
| 6,038,334 | A | | 3/2000 | Hamid | |
| 6,049,602 | A | * | 4/2000 | Foladare et al. | 379/265.04 |
| 6,058,303 | A | | 5/2000 | Astrom | |
| 6,070,241 | A | | 5/2000 | Edwards | |
| 6,078,807 | A | * | 6/2000 | Dunn et al. | 455/410 |
| 6,084,967 | A | | 7/2000 | Kennedy | |
| 6,091,835 | A | | 7/2000 | Smithies et al. | |
| 6,092,192 | A | | 7/2000 | Kanevsky | |
| 6,094,476 | A | | 7/2000 | Hunt et al. | |
| 6,119,084 | A | | 9/2000 | Roberts et al. | |
| 6,144,938 | A | | 11/2000 | Surace | |
| 6,149,056 | A | | 11/2000 | Stinson et al. | |
| 6,157,707 | A | | 12/2000 | Baulier et al. | |
| 6,167,517 | A | | 12/2000 | Gilchrist et al. | |
| 6,246,751 | B1 | | 6/2001 | Bergl et al. | |
| 6,246,988 | B1 | * | 6/2001 | Schier | 704/273 |
| 6,266,640 | B1 | | 7/2001 | Fromm | |
| 6,275,940 | B1 | | 8/2001 | Edwards | |
| 6,320,956 | B1 | | 11/2001 | Cherry | |
| 6,359,971 | B1 | * | 3/2002 | Haimi-Cohen et al. | 379/88.01 |
| 6,370,508 | B2 | | 4/2002 | Beck | |
| 6,401,066 | B1 | | 6/2002 | McIntosh | |
| 6,404,747 | B1 | | 6/2002 | Berry et al. | |
| 6,493,446 | B1 | | 12/2002 | Cherry | |
| 6,501,956 | B1 | | 12/2002 | Weeren | |
| 6,604,075 | B1 | | 8/2003 | Brown | |
| 6,650,736 | B1 | | 11/2003 | Unger | |

OTHER PUBLICATIONS

VOICELOG, VoiceLog Offers Third Party Verification for Wireless Number Portability, Press Release, www.voicelog.com, Oct. 31, 2003.

VOICELOG, Bray Joins VoiceLog as Director of Live Operator Verification Services, Press Release, www.voicelog.com, Oct. 28, 2003.

VOICELOG, VoiceLog Offers Sarbanes–Oxley Employee Hotline Solution, Press Release, www.voicelog.com, Oct. 7, 2003.

VOICELOG, VoiceLog Makes INC 500 List of Fastest–Growing Private Companies Second Straight Year, Press Release, www.voicelog.com, Oct. 3, 2003.

VOICELOG, VoiceVerified Helps Telemarketers Meet New FTC Sales Rule, Press Release, www.voicelog.com, May 1, 2003.

VOICELOG, VoiceLog Scores A Win For Telecom Industry Against "Drop–Off" Rule Seeks Partners for Potential Suit Against FCC to Overturn, Press Release, www.voicelog.com, Mar. 27, 2003.

VOICELOG, VoiceLog Helps Telemarketers Meet New Telephone Sales Rule by Mar. 31 Deadline, No Need to Make Capital Investment to Record Telemarketing Sales, Press Release, www.voicelog.com, Mar. 12, 2003.

VOICELOG, VoiceLog Passes Half–Million Mark for Live Operator Verification Services Adds New Features and Functionality, Press Release, www.voicelog.com, Feb. 24, 2003.

VOICELOG, VoiceLog Ranked 77th in Inc Magazine's "Inc 500" for 2002, Press Release, www.voicelog.com. Oct. 15, 2002.

VOICELOG, VoiceLog Appoints Karl Erickson As Chief Technology Office, Press Release, www.voicelog.com, Oct. 7, 2002.

VOICELOG, VoiceLog Announces "Verifiably Able" New Program Offers Meaningful Employment to Physically Challenged, Press Release, www.voicelog.com, May 28, 2002.

VOICELOG, VoiceLog Announces New Operations Center Added Location Provides Additional Capacity, Redundancy, Reliability, Press Release, www.voicelog.com, Mar. 1, 2002.

VOICELOG, VoiceLog Announces Live Operator Third Party Verification, Press Release, www.voicelog.com, May 1, 2001.

VOICELOG, VoiceLog Announces Package for New FCC Rules, Press Release, www.voicelog.com, Jan. 3, 2001.

VOICELOG, VoiceLog and TSS AG (Switzerland) Bring Third Party Verification to Europe, Press Release, www.voicelog.com, Jan. 17, 2001.

VOICELOG, VoiceLog Announces Voice Recognition for Third Party Verifications, Press Release, www.voicelog.com, Nov. 4, 1997.

VOICELOG, VoiceLog Announces Winter Weather Insurance For Third Party Verifications, Press Release, www.voicelog.com, Oct. 31, 1997.

VOICELOG, VoiceLog Guarantees Third Party Verification Compliance, Press Release, www.voicelog.com, Sep. 23, 1997.

VOICELOG, California Leads the Nation in Slamming Control, Press Release, www.voicelog.com, Mar. 27, 1998.

VOICELOG, VoiceLog Announces CPNI Verification Products, Press Release, www.voicelog.com, Mar. 4,1998.

VOICELOG, VoiceLog's 50 State "Anti–Slamming Rules Report" Available on the Internet, Press Release, www.voicelog.com, Feb. 4, 1998.

VOICELOG, VoiceLog Announces Cost Effective Verification for Electric Service, Press Release, www.voicelog.com, Jan. 6, 1998.

VOICELOG, VoiceLog Reaches 100 Accounts in 1997, Press Release, www.voicelog.com, Jan. 2, 1998.

VOICELOG, VoiceLog and Telecommunications On Demand Announce Distribution Agreement, Press Release, www.voicelog.com, Nov. 12, 1997.

VOICELOG, VoiceLog Offers Industry–Wide Solution to "Cramming", Press Release, www.voicelog.com, Apr. 21, 1998.

VOICELOG, VoiceLog Third Party Verification Releases Free Analysis of New FCC Anti–Slamming Rules, Press Release, www.voicelog.com, Feb. 2, 1999.

VOICELOG, VoiceLog Meets Anti–Slamming Rules for E–Commerce Internet Orders, Press Release, www.voicelog, com, Jan. 27, 1999.

VOICELOG, VoiceLog Announces "Quick Freeze"–"The New Third Party Verification Program for Carrier Freezes" to Meet the FCC Anti–Slamming Rules, Press Release, www.voicelog, com, Jan. 12, 1998.

VOICELOG, VoiceLog Closes 1998 With Two Million Third Party Verification Transactions–Now the Leader in Preventing Slamming, Press Release, www.voicelog, com, Jan. 30, 1998.

VOICELOG, VoiceLog Third Party Verification Helps Telecommunications Industry Meet New FCC Anti–Slamming Rules, Press Release, www.voicelog, com, Dec. 20, 1998.

VOICELOG, VoiceLog Is First Choice for Third Party Verification, Press Release, www. voicelog, com, Aug. 10, 1998.

VOICELOG, Total Slamming Control—The Ultimate in Third Party Verification, Press Release, www.voicelog, com, May 11, 1998.

VOICELOG, VoiceLog, Releases Study on State Attitudes Toward FCC Anti–Slamming Rules, Press Release, www.voicelog, com, Apr. 14, 1999.

VOICELOG, VoiceLog Third Party Verification Releases Updated Anti–Slamming Rules Report, www.voicelog, com, Mar. 16, 1999.

VOICELOG, VoiceLog Announces Web Interface for Verification Retrievals and Audio Playback, Press Release, www.voicelog, com.

VOICELOG, VoiceLog Announces Dual Channel Recording, Press Release, www.voicelog, com, Jan. 4, 2000.

VOICELOG, VoiceLog Announces High Quality Name and Address Transcription, Press Release, www.voicelog, com, Feb. 1, 2000.

VOICELOG, VoiceLog Goes to the Ends of the Earth to Review Third Party Verification, Press Release, www.voicelog, com, Feb. 29, 2000.

VOICELOG, FCC Acknowledges Validity, Value of Automated Third Party Verification, Press Release, www.voicelog, com, Aug. 24, 2000.

VOICELOG, VoiceLog Announces True State–Specific Third Party Verification, Press Release, www.voicelog, com, May 9, 2000.

VOICELOG, VoiceLog Announces Easy Recording Download Function, Press Release, www.voicelog, com, Mar. 1, 2000.

VOICELOG, VoiceLog Announces Inbound That Delivers, Press Release, www.voicelog, com, Oct. 2, 2000.

VoicePrint Security for Credit Cards, IBM Technical Disclosure Bulletin, Feb. 1994, pp. 189–190, vol. 37, Publication No. 2B.

PriceInteractive Launches Most Reliable Anti–Slamming Service New Enhanced Third Party Verification (TM) Solutions Cut Carrier Costs By More Than Half, PR Newswire via NewsEdge Corporation, Jul. 1, 1999.

U.S. Patent Office Recognizes New Multifunction Telecommunications Technology, Business Wire, Inc., Jun. 6, 1989.

Moving Into the Future, Newsweek, Apr. 29, 2002, 40 pages.

Face Recognition Technology, MATE–CCTV, Ltd., www-.mate.co.il.

Niccolai, James, Comdex: Biometrics Puts a Face—or Finger—on Security, InfoWorld Media Group, Inc., Nov. 15, 2001.

Bruce, Laura, Face–Scanning, Fingerprinting ATMs Gain Ground, Bankrate.com, Mar. 2, 2001.

Panasonic Authenticam Iris Recognition Camera, www.panasonic.com.

Pearson, Helen, Stats Say Aye to ID Eye, Nature News Service, www.nature.com.

Iris Recognition Could Smooth Identification, The Instrumentation, Systems, and Automation Society, www.isa.org, Jul. 31, 2000.

Yang, S. Jae, A New Look In Security, PC Magazine, www.pcmag.com, Jan. 15, 2002.

Iris Recognition: The Technology, www.iris–scan.com.

Fingerprint and Eye Iris Pattern Identification Software, Libraries and Source Code, Neurotechnologija, Ltd., www-.neurotechnologija.com, Apr. 15, 2002.

Triton Secure, www.tritonsecure.com.

* cited by examiner

Logon Process

METHOD, APPARATUS, AND COMPUTER READABLE MEDIA FOR MINIMIZING THE RISK OF FRAUDULENT ACCESS TO CALL CENTER RESOURCES

CROSS REFERENCE TO RELATED APPLICATIONS

This application is a continuation-in-part of application Ser. No. 10/156,444, filed May 28, 2002, now U.S. Pat. No. 6,804,331 entitled Method, Apparatus, and Computer Readable Media for Minimizing the Risk of Fraudulent Receipt of Telephone Calls, and claims the benefit of the filing date of the same to the extent that common subject matter is disclosed by the same.

According to various aspects of the invention, the various voice samples discussed herein may consist of a standard or uniform phrase that must be repeated each time a voice sample is taken. For example, this standard phrase may be a greeting used by a teleservices agent to greet callers. However, depending on various implementations of the invention as described herein, the voice samples may or may not need to consist of the exact same phrase.

Regarding other embodiments of the invention, if iris recognition technology is chosen, then suitable technology for the biometric capture device 560 is commercially available from a variety of vendors. As a non-limiting example, Panasonic Corporation (www.panasonic.com) markets the Authenticam™ device, which is described in detail at the URL www.panasonic.com/medical industrial/iris.asp. This particular device can not only extract and analyze biometric data, but can also capture and transmit video and image data as a dual-channel camera suitable for video conferencing or the like. Various embodiments of the invention can capitalize on this feature by providing video equipment 565a for use by the caller 520a, providing both the Authenticam™ (represented by biometric capture device 560) and video equipment 565b for use by the person 310, and adapting the communication links through PSTN 535 and call center 510 to support the bandwidth demands of live video transmission. These embodiments of the invention can enable the person 310 maintain live video contact with the caller 520a, in addition to audio contact, during interactions therebetween. This function is discussed in further detail below.

Continuing with the iris recognition embodiment, it will be understood that this embodiment may be practiced with equipment other than the Authenticam™ as described above, and with equipment sourced from vendors other than Panasonic. Further, while the Authenticam™ product integrates iris pattern extraction technology and a camera into one unit, it will be understood that these two functions could be segregated and implemented on separate, respective hardware. Specifically, hardware dedicated to extracting and/or processing the various types of biometric information outlined above may function along with conventional video equipment 565b, such as cameras, displays, monitors, or web cams.

Video equipment and related biometric feature extraction systems may also be used to implement other embodiments of the invention using retinal or facial features as the biometric feature of interest for authentication. Regarding such other embodiments, technology for authenticating the person 310 using fingerprint or palmprint scanning and analysis is known and readily available from a variety of vendors. Also, facial scanning and recognition technology is steadily becoming more widespread as an effective biometric authentication tool, and the invention may readily be extended to operate with such technology, as well as other biometric or other authentication technologies that may be developed in the future.

DETAILED DESCRIPTION OF ILLUSTRATIVE EMBODIMENTS

Overview of the Invention

Figure 1:
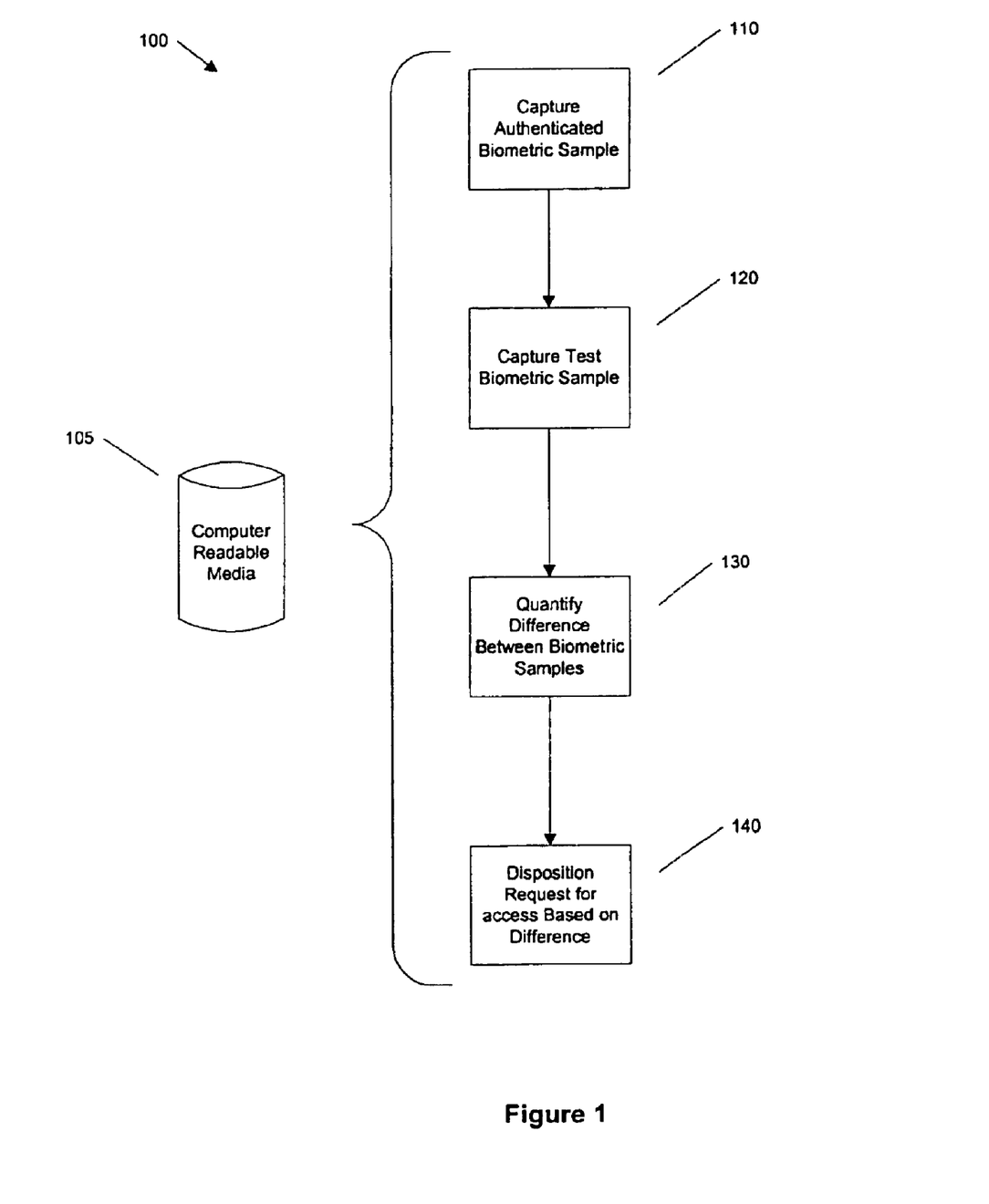
FIG. 1 is a flowchart illustrating a process flow provided according to an illustrative embodiment of the invention.

FIG. 1 is a flowchart illustrating a process flow 100 provided according to an illustrative embodiment of the invention. More specifically, the invention provides a method of minimizing fraudulent access to call center resources by seeking to ensure that the person accessing call center resources, such as to process calls in a call center or home agent environment, is the same person screened during the employment clearance process and trained to handle those calls during instruction programs. The invention helps to minimize the risk of an imposter fraudulently accessing call center resources to misappropriate goods/services ordered by call center clients. The invention may be applicable in either a conventional call center setting or a home agent setting, wherein the agent processes call center calls from a physical location remote from the call center site, such as the agent's home.

Figure 3:
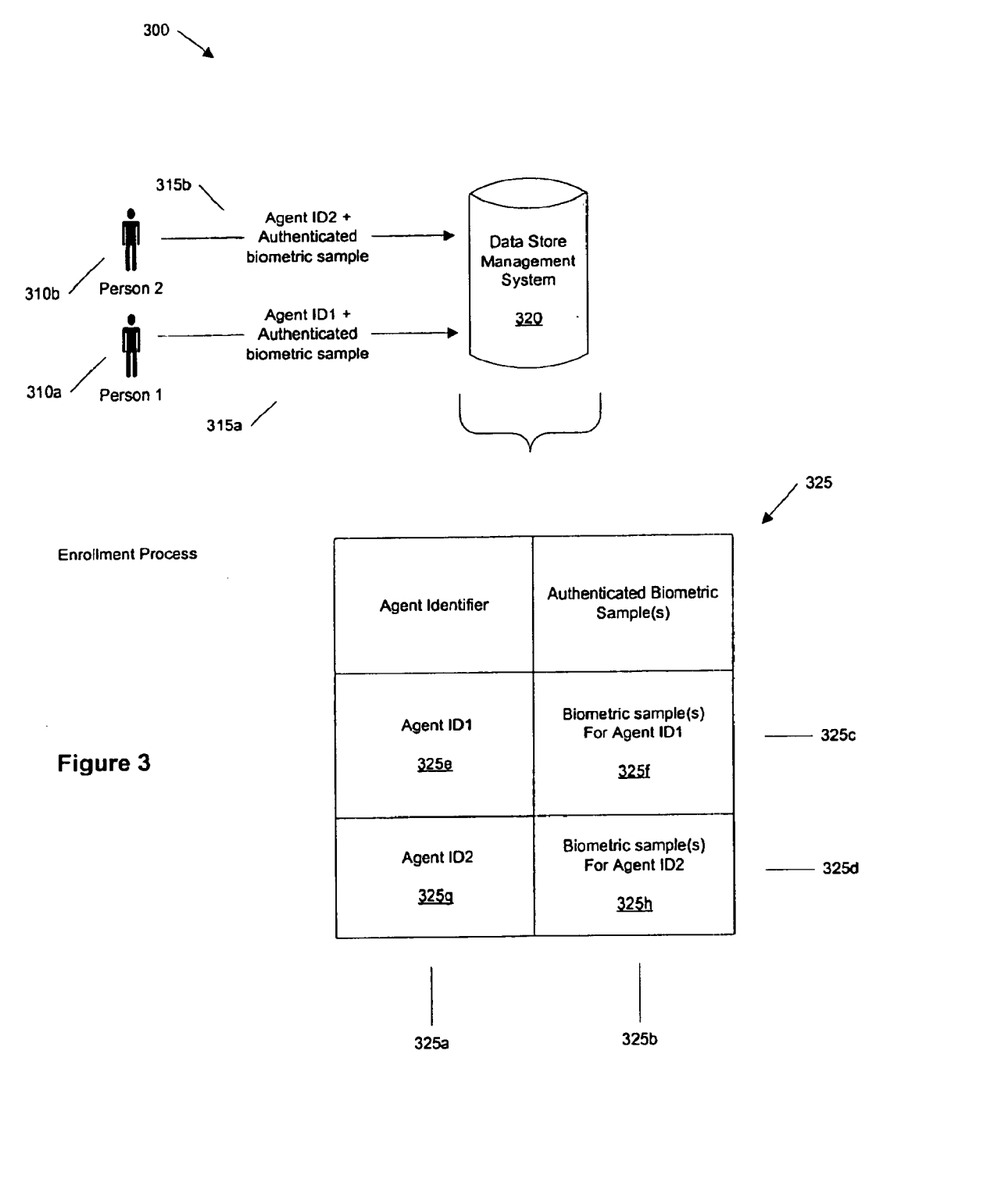
FIG. 3 is a block diagram illustrating an enrollment process performed according to an illustrative embodiment of the invention.
Figure 4:
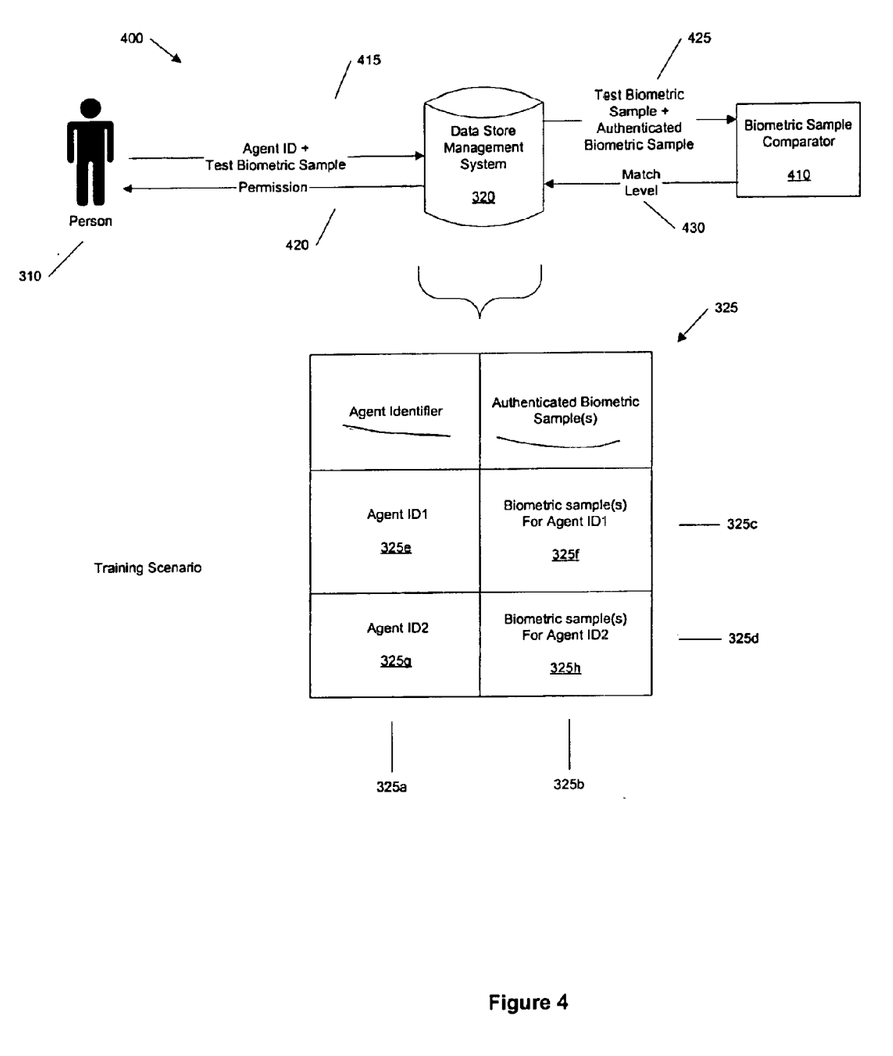
FIG. 4 is a block diagram of a training scenario performed according to an illustrative embodiment of the invention.
Figure 5:
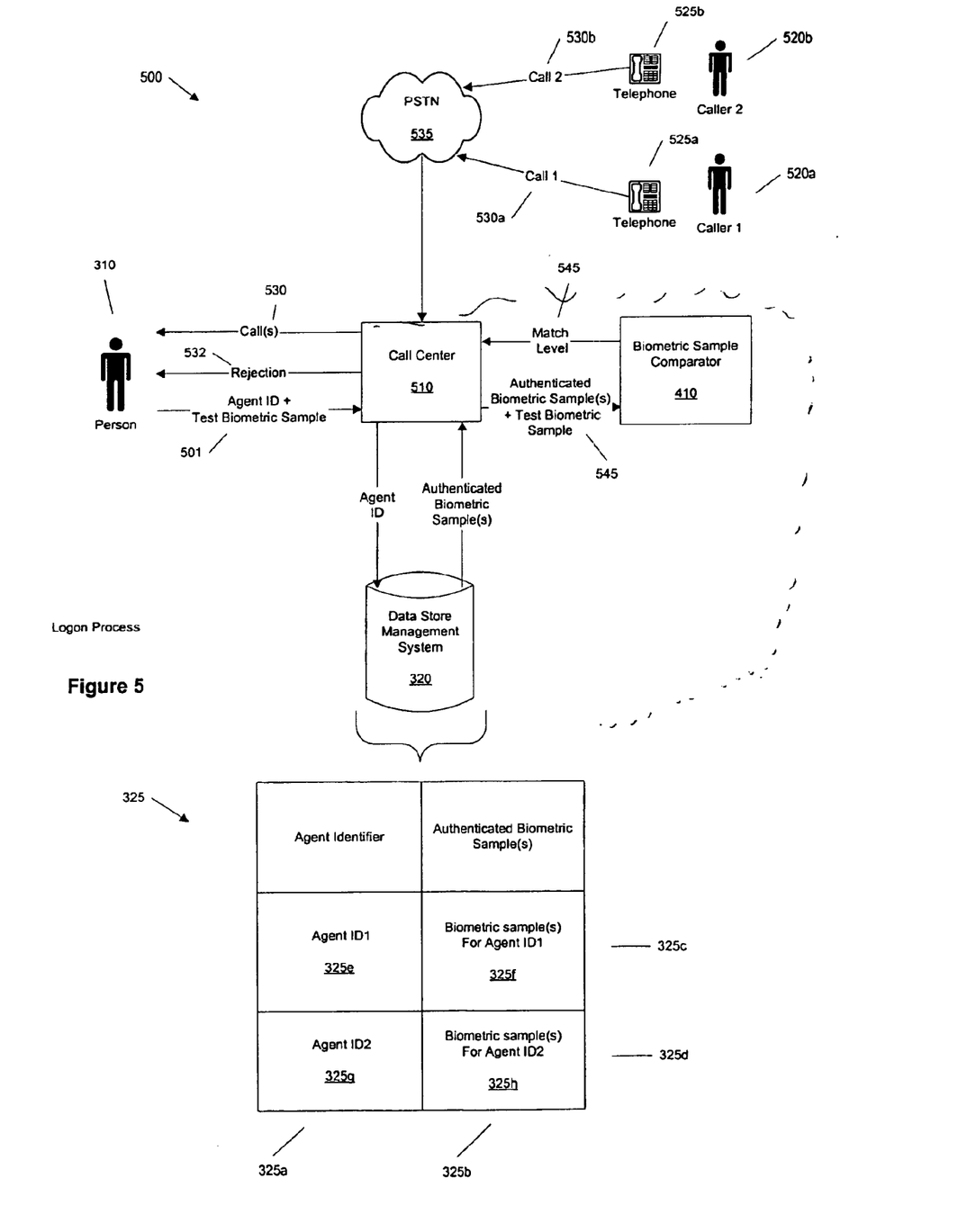
FIG. 5 is a block diagram of a log-on process performed according to an illustrative embodiment of the invention.
Figure 5A:
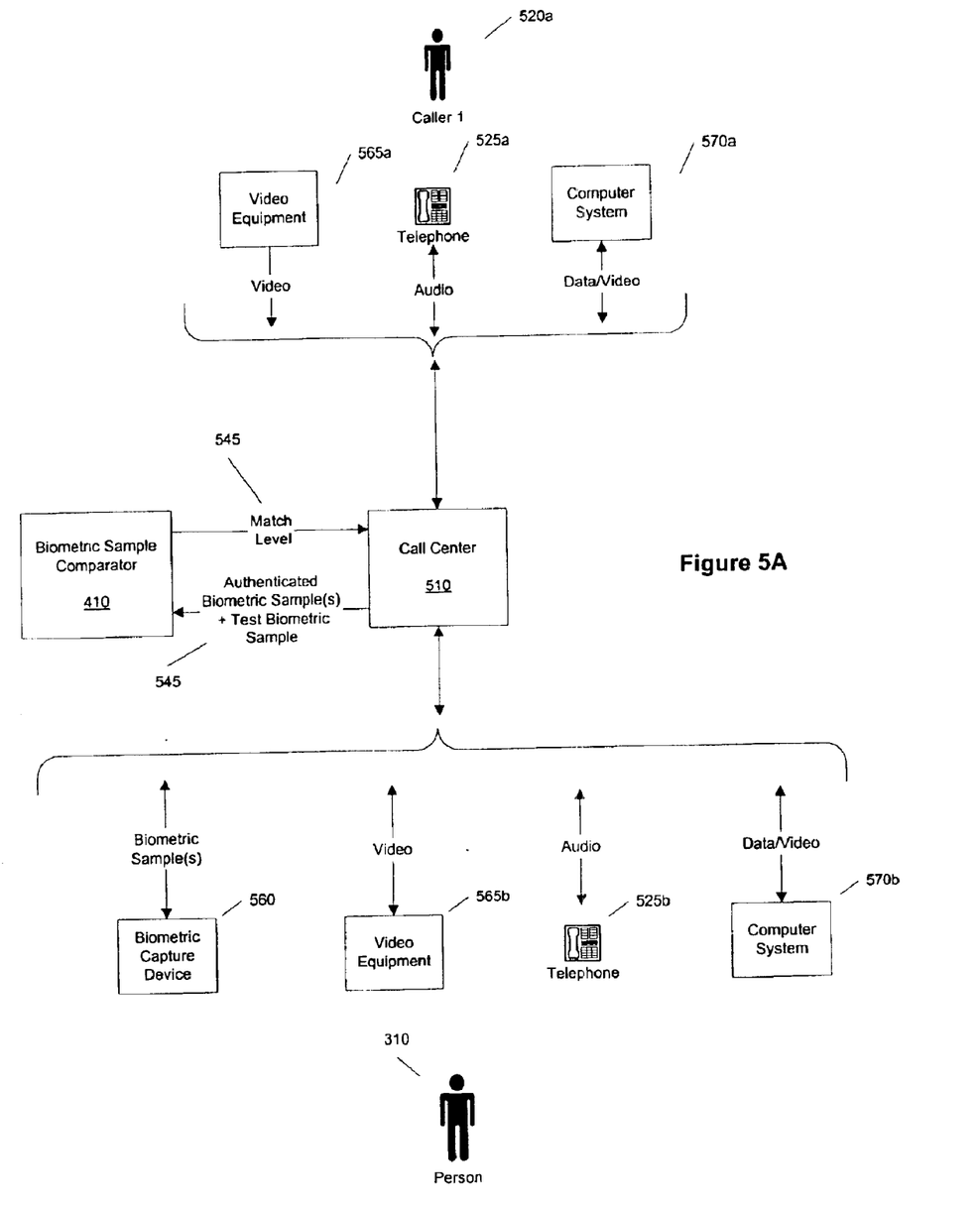
FIG. 5A is a block diagram of various hardware components that can be utilized according to various embodiments of the invention as shown in FIG. 5.

As shown in block 110 of FIG. 1, an illustrative embodiment of the invention includes capturing an authenticated biometric sample of at least one person (represented as 310 in FIGS. 3–5). In the context of this specification, the term "authenticated biometric sample" refers to a biometric sample obtained from the person 310 in a face-to-face or other interaction, wherein the entity obtaining the biometric sample from the person 310 is able to determine with reasonable certainty that the person 310 is actually who he or she purports to be. This verification can be obtained by reviewing identification documents provided by the person and judging their authenticity, or by other suitable security measures as may be known to those skilled in the art.

At least one test biometric sample of the person 310 is captured when that person 310 is submitting a request for authorization to receive training or to process telephone calls (block 120). In the context of this specification, the term "test biometric sample" refers to a biometric sample obtained from the person 310 that is of unknown authenticity, and needs to be verified as genuine or authentic. Finally, the method includes quantifying a difference between the authenticated biometric sample and the test biometric sample (block 130), and dispositioning the request for authorization based upon this difference (block 140).

Figure 2:
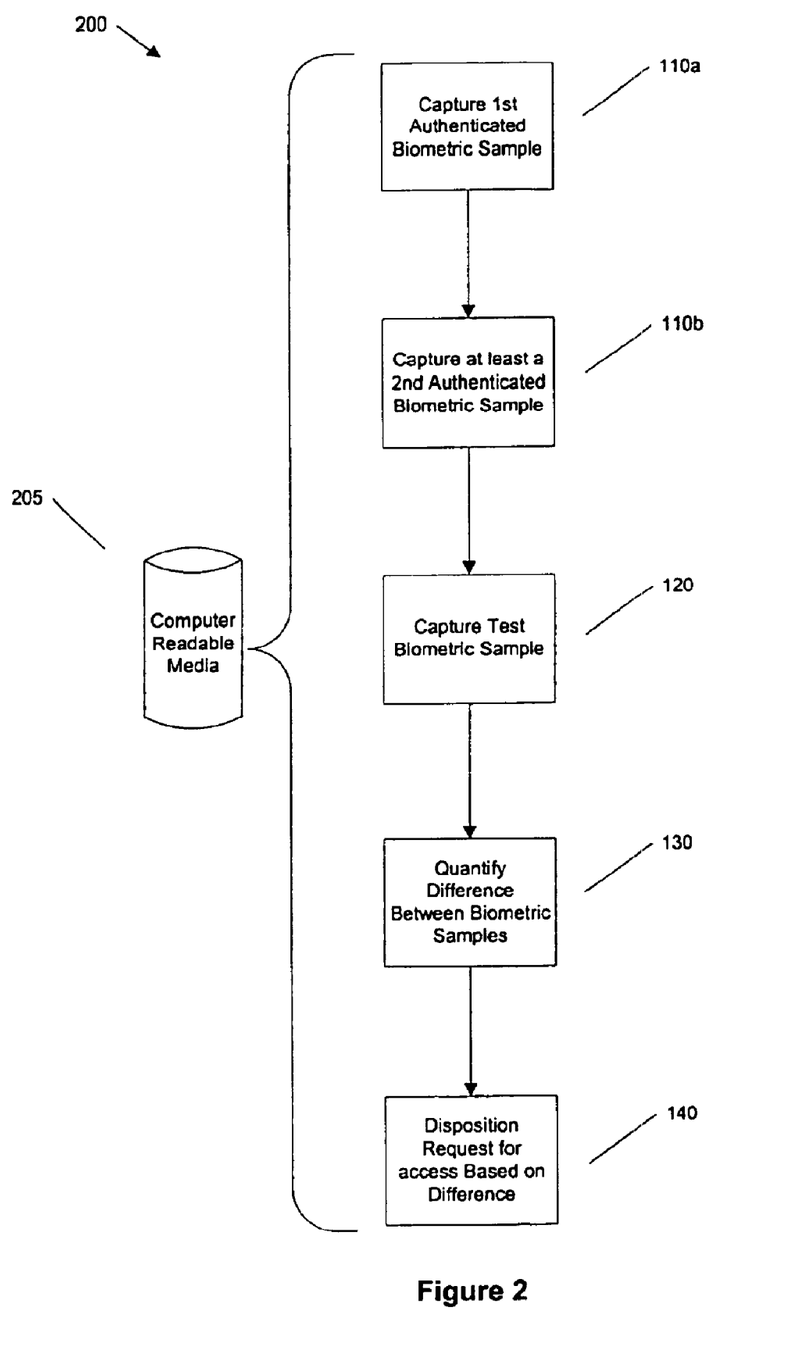
FIG. 2 is a flowchart illustrating a process flow provided according to another illustrative embodiment of the invention.

FIG. 2 is a flowchart illustrating a process flow 200 provided according to another illustrative embodiment of the invention. The FIG. 2 embodiment of the method includes capturing not only a first (block 110a) but also a second (block 110b) authenticated biometric sample of the person 310 submitting a request for authorization. The remaining processing shown in FIG. 2 remains substantially unchanged from FIG. 1.

As discussed in further detail below, the first authenticated biometric sample of the person 310 can be obtained during a first meeting with the person 310, such as an initial interview or human resources screening. The second authenticated biometric sample of the person 310 can be obtained during a second, subsequent meeting with that person 310, such as for a training session(s). The method of the invention as illustrated in FIG. 1 can be employed during the second meeting with that person 310 to authenticate the second biometric sample. After that second biometric sample is authenticated, it can then become a second authenticated biometric sample, thereby providing two separate authenticated biometric samples for later use. Having multiple authenticated biometric samples on hand may improve the accuracy of future analyses performed on test biometric samples.

FIG. 3 is a block diagram illustrating apparatus 300 used to implement an enrollment process performed according to an illustrative embodiment of the invention. Such apparatus 300 may be suitable for practicing the processing represented by the blocks 110 and 110a in FIGS. 1 and 2. As a non-limiting example, the enrollment process illustrated in FIG. 3 can include capturing an authenticated biometric sample from a person 310a or 310b when that person 310a or 310b submits an employment application for a position as a teleservices agent at either a call center or as a home agent. FIG. 3 illustrates two persons 310a and 310b, with each of the two persons providing respective information shown respectively as 315a and 315b to be stored in a data store management system 320. Each person 310a and 310b provides a respective unique agent identifier, along with an authenticated biometric sample to be stored in the data store management system 320, which agent identifier and biometric sample are collectively shown as 315a and 315b. The agent identifier can be, for example, a social security number or other unique identifier provided by the persons 310a or 310b or by the prospective employer.

FIG. 3 also illustrates a data structure 325 that may be used to construct the data store management system 320, with the data structure 325 including column 325a for the unique agent identifier and a column 325b for authenticated biometric samples associated with each unique agent identifier. Rows 325c and 325d store respective entries for persons 310a and 310b, while columns 325a and 325b store agent ID and biometric sample data, respectively. Column 325a can serve as a search index or key field, enabling the data store management system 320 to retrieve a biometric sample associated with a given agent ID by locating the given agent ID in column 325a and pulling the corresponding biometric sample from column 325b. Specifically, cell 325e contains the agent identifier data for one of the persons 310a or 310b, while a cell 325f contains one or more authenticated biometric samples for that person 310a or 310b. Similarly, a cell 325g contains agent identifier data for the other of the persons 310a or 310b, while a cell 325b contains one or more authenticated biometric samples for the other of the persons 310a or 310b.

Those skilled in the art will understand that the invention is not limited to the data structure 325 shown in FIG. 3. Specifically data structure 325 and data store management system 320 could be adapted or modified to store data associated with any number of respective persons 310. Further, the format, layout, and structure of the data structure 325 as illustrated in FIG. 3 can be modified by those skilled in the art as necessary or convenient for a given implementation of the invention as described herein. Specifically, additional fields may be added, deleted, or modified as suitable. The configuration shown in FIG. 3 is shown only for convenience in illustrating and describing various aspects of the invention, and not to limit the interpretation of the invention as described herein. Two persons 310a and 310b are shown in FIG. 3 for convenience in describing this aspect of the invention.

The data store management system 320 may be realized by a variety of commercially available data base management systems. Suitable systems are available from vendors such as Microsoft, IBM/Informix, or others.

FIG. 4 is a block diagram of a training apparatus and process 400 provided according to an illustrative embodiment of the invention. The apparatus shown in FIG. 4 may be useful for practicing the processing represented by block 111b in FIG. 2, along with blocks 120 and 130 shown in FIGS. 1 and 2. The training scenario 400 illustrated in FIG. 4 assumes that at least a first authenticated biometric sample has been captured previously, such as at the time of an initial human resources interview or application process, as illustrated in FIG. 3 above. The FIG. 4 embodiment includes capturing a second biometric sample during a subsequent session involving the person 310 who applied previously for the agent position, and authenticating this biometric sample as genuine, using, for example, the method illustrated in FIG. 1. In this manner, the identity of the person 310 reporting to this subsequent session is confirmed to match the identity of the person 310 who applied originally for the position, and was screened or cleared accordingly, serving to minimize the risk of fraudulent or incompetent handling of phone calls by the person 310.

As shown in FIG. 4, the person 310 presents his or her agent identifier (ID), plus the test biometric sample to be authenticated, shown collectively as 415, to be stored in the data store management system 320. At least the test biometric sample and an authenticated biometric sample, shown collectively as 425, are forwarded to a biometric sample comparator 410, which compares the test biometric sample to a previously authenticated biometric sample associated with that person 310. The previously authenticated biometric sample corresponding to the person 310 may be retrieved by the data store management system 320 from the data structure 325, using the agent ID (part of data flow 415) obtained from the person 310 as an index into the data structure 325, specifically by using the agent ID as a key for traversing column 325a, and forwarding to the biometric sample comparator 410 the authenticated biometric sample from column 325b that matches the key.

The biometric sample comparator 410 generates a match signal 430 indicating the level of consistency between the input biometric samples, thereby quantifying the match between the two or more biometric samples. If there is a sufficient match between the test biometric sample and the one or more authenticated biometric samples, the person 310 is granted permission (represented by data flow 420) to receive training in various embodiments of the invention, the test biometric sample can be authenticated as a further authenticated biometric sample, and stored in the data store column 325b associated with the agent identifier provided by the person 310 requesting training.

FIG. 5 is a block diagram of a log-on apparatus and process 500 provided according to an illustrative embodiment of the invention. The apparatus as shown in FIG. 5 may be suitable for practicing the processing represented by blocks 120, 130, and 140 as shown in FIGS. 1 and 2. The log-on process 500 illustrated in FIG. 5 begins by capturing a test biometric sample and agent ID, shown collectively as 501, when the person 310 submits a request to access call center 510 to process telephone calls received by the call center 510. These telephone calls can include all types of inbound or outbound calls. Example telephone calls 530a and 530b are handled by the call center 510 through public-switched telephone network (PSTN) 535. Example callers 1 and 2, shown respectively by the reference numbers 520a and 520b, interact with call center 510 using telephones 525a and 525b.

According to various embodiments of the invention, the person 310 requesting access to the call center 510 may be a teleservices agent reporting for duty at the physical location of the call center 510, or may be a remote or home agent logging on to access computerized resources of the call center 510 from a location remote from the call center 510, such as the residence of the home agent.

As shown in FIG. 5, when the person 310 attempts to log into the call center 510, the person 310 submits a unique agent ID and a test biometric sample, shown collectively as data 501. Upon receiving this data 501, the call center 510 retrieves one or more authenticated biometric samples from the data store management system 320 using the agent ID as an index or key field for the search, as discussed above. The call center 510 then forwards the authenticated biometric sample(s) and the test biometric sample, shown collectively as 545 to the biometric sample comparator 410 for analysis. The biometric sample comparator 410 then compares the authenticated biometric sample(s), pulled from column 325b of the data structure 325, to the test biometric sample obtained from the person 310 to determine how closely they match, as indicated by a match level signal 545 sent to the call center 510. The call center 510 then analyzes the match level signal 545 obtained from the biometric sample comparator 410 and determines whether to grant access permission to the person 310 attempting to log in. If the match level signal 545 returned from the biometric sample comparator 410 is sufficiently high, the call center 510 will grant the log in request submitted by the person 310. The person 310 will then have access to call center resources to process calls 530 from/to respective callers 520a and 520b. Otherwise, the call center 510 will reject the logon request, represented by data flow 532.

FIG. 5A is a block diagram of hardware components that can be utilized according to various embodiments of the invention as shown in FIG. 5. According to these various embodiments, the invention can use different types of biometric samples to authenticate the person 310 seeking access to the call center 510. As non-limiting examples, the invention may be practiced using various biometric authentication technologies, including voice/speech recognition and analysis, fingerprint/palmprint capture and analysis, retinal and iris scans, facial feature extraction and analysis, and other current technologies. The invention could also readily be extended to operate with other technologies developed in the future that lend themselves to biometric authentication of human beings. Biometric capture device 560 is shown in general form in FIG. 5A, as a device operable to capture biometric sample(s) from the person 310 submitting a login request.

Depending on which technology is chosen to authenticate persons 310, the technology used to implement the biometric capture device 560 and the biometric sample comparator 410, and the character of the biometric sample obtained from the person 310, will vary accordingly. If a speech/voice recognition implementation is chosen, then voice authentication or speech recognition technology may be appropriate, and voice samples constitute the biometric samples. Suitable technology for processing such voice samples is commercially available from a wide variety of vendors, such as, for example, Nuance Corporation of Menlo Park, Calif. (www.nuance.com). However, it will be understood by those skilled in the art that the invention may be implemented using voice authentication or speech recognition technology from a wide variety of vendors, and is not limited to specific technology sourced from any particular vendor. This voice authentication or speech recognition technology, from whatever vendor, will be understood to provide a voice authentication or speech recognition engine as referenced elsewhere in this specification.

Continuing with the discussion of the hardware shown in FIG. 5A, video equipment 565a (including a video camera and/or a monitor) a telephone 525a, and a computer system 570a may be provided for ready use by the caller 520a. Illustrative data flows associated with each one of these devices are shown in FIG. 5A. At the other end of FIG. 5A, the biometric capture device 560, the video camera/monitor 565b, a telephone 525c, and a computer system 570b may be provided for use by the person 310. These various devices provided at the respective locations of the caller 520a and the person 310 can communicate using the resources of the call center 510 to pass the illustrative data flows therebetween as shown in FIG. 5A. According to various embodiments of the invention, some or all of the foregoing hardware components may be included in a given implementation of the invention.

Video equipment 565b may also lend itself not only to authenticating the person 310 as a legitimate agent trained and/or authorized to handle calls, but also to enabling the person 310 to interact more effectively with the caller 520a, especially if the caller 520a has access to video equipment 565a. "Video equipment" 565a and 565b as used in the context of this description refers to equipment suitable for capturing either still images or motion video, as appropriate in a given implementation, and/or equipment suitable for displaying such still images or motion video. In other embodiments of the invention, a monitor associated with the computer systems 570a and 570b may also be adapted to provide video feedback to the caller 520a and the person 310, respectively.

Such video feedback may be helpful during technical support or "help desk" type calls. For example, the caller 520a may position his/her video equipment 565a as necessary to transmit images/video of his/her computer system 570a to the person 310, thereby enabling the latter to view directly any error messages, system functions/malfunctions, or the like generated by the computer system 570a, as well as to observe firsthand the results of any remedial actions recommended by the person 310. Similarly, the person 310 can position his/her video equipment 565b as necessary to transmit images/video of his/her computer system 570b to the caller 520a thereby guiding the latter in implementing solutions or work-arounds recommended by the person 310.

The above discussion of illustrative uses of these embodiments of the invention is not intended to limit interpretations of the invention, and the video equipment 565a and 565b and computer systems 570a and 570b communicating through the call center 510 may be used for any purpose germane to the interaction between the person 310 and the caller 520a. For example, the person 310 may find it helpful to guide caller 520a using visual aids, charts, or the like while providing technical support to the caller 520a, and the video equipment 565a and 565b may facilitate use of such visual aids, charts, or the like. Further, these hardware components may be configured to support use of software that facilitates collaboration or meetings between person 310 and callers 520a and/or 520b, such as the NetMeeting™ software available from Microsoft Corporation in Redmond, Wash., or the like.

Figure 6:
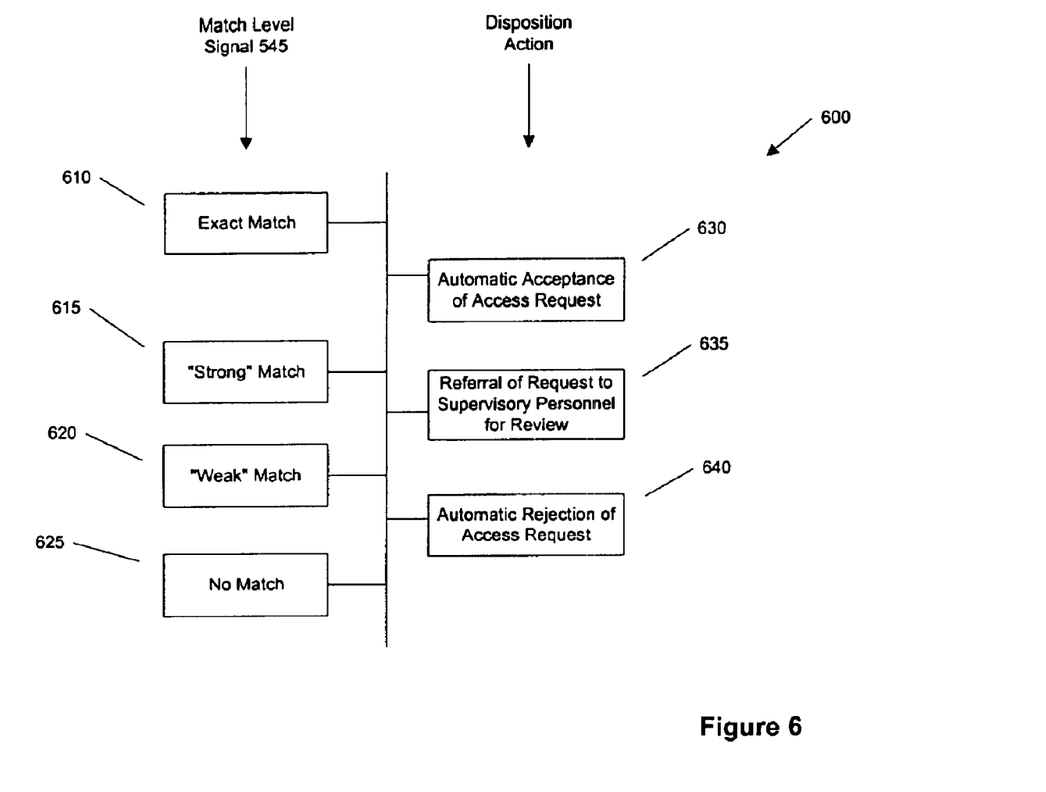
FIG. 6 is a block diagram illustrating a thresholding process employed by an illustrative embodiment of the invention, and actions related to that process.

FIG. 6 is a block diagram illustrating a thresholding process 600 employed by an illustrative embodiment of the invention, and follow-up actions related thereto. This thresholding process 600 may be employed by the call center 510 to disposition the request for access submitted by the person 310, which processing is represented by block 140 in FIGS. 1 and 2. The block diagram of FIG. 6 illustrates a process of defining at least a first threshold value for the difference between the one or more authenticated biometric samples associated with a given agent ID, and the test biometric sample submitted by the person 310 purporting to be associated with the agent ID. As shown in FIG. 6, the signal 545 (as output by biometric sample comparator 410) representing the level of match between the authenticated biometric sample(s) and the test biometric sample may be characterized as an exact match 610, a strong match 615, a weak match 620, or no match whatsoever 625. If the match level signal 545 falls between the threshold for an exact match 610 and a strong match 615, the logon request may be automatically accepted (block 630) without further processing.

If the match level signal 545 falls between the thresholds for a strong match 615 and a weak match 620, the logon request may be referred to supervisory personnel for review and processing (block 635). This referral process 635 may include having the person 310 contact supervisory personnel by telephone or otherwise. In addition, an e-mail or other communication can be routed to supervisory personnel describing the situation as well. The supervisory personnel can then discuss the matter with the person 310, and if the supervisory personnel are satisfied as to the identity of the person 310, then the supervisory personnel may grant the person's log in request. Otherwise, the supervisory personnel will reject the logon request.

If the match level signal 545 falls between the thresholds for a weak match 620 and no match whatsoever 625, the logon request may be automatically rejected (block 640). Follow-up action may be taken to investigate the person 310 submitting the request for access associated with processing shown in blocks 635 and 640.

The thresholds 610, 615, 620, and 625 are shown for illustrative purposes only; any number of discrete thresholds can be employed according to various aspects of the invention. Further, these thresholds may be associated with various values of the match level signal 545, the values of which signal in turn depends on the character of the outputs from the biometric sample comparator 410. Those skilled in the art will understand that the values of the match level signal 545 assigned to these various thresholds may readily be adjusted or fine-tuned as appropriate for the circumstances or requirements of a given application of the invention without departing from the scope of the invention.

Returning to FIGS. 1 and 2, those skilled in the art will understand that a program of instructions can be loaded and stored onto program storage media or devices 105 and 205 that are readable by a computer or other machine, embodying a program of instructions executable by the machine to perform the various aspects of the method as discussed and claimed herein, and as illustrated in the Figures. Generally speaking, the program storage media 105 and 205 can be implemented using any technology based upon materials having specific magnetic, optical, semiconductor or other properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, various embodiments of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage devices 105 and 205 can be affixed permanently or removably to a bay, socket, connector, or other hardware provided by the cabinet, motherboard, or other component of a given computer system.

Those skilled in the art will also understand that one or more computers programmed in accordance with the above teaching using known programming languages provides means for realizing the various functions, methods, and processes as described and claimed herein and as illustrated in the drawing figure attached hereto. Those skilled in the art can implement a suitable application program executing the various aspects of the method discussed above and shown in the drawing figures using any suitable programming or scripting language. However, it will be understood that the invention as described herein is not dependent on implementation in any particular operating system, environment, or programming language. Example operating systems include without limitation LINUX, UNIX, any of the Windows™-family of operating systems, or others, and example languages include without limitation a variety of structured and object-oriented languages such as C, C++, Visual Basic, or others.

Various embodiments of the invention are described above to facilitate a thorough understanding of the various aspects of the invention. However, these embodiments are to be understood as illustrative rather than limiting in nature, and those skilled in the art will recognize that various modifications or extensions of these embodiments fall within the scope of the invention, which is defined by the appended claims. For example, while the specification describes various functions and processes, and illustrates apparatus capable of performing those processes, those skilled in the art will recognize that the various functions, processes, and data flows may be adapted, modified or otherwise altered in various implementations of the teaching contained therein without departing from the scope of the invention.

We claim:

1. A method of minimizing fraudulent processing of telephone calls, the method comprising at least the following:

capturing respective authenticated biometric samples corresponding to a plurality of respective persons;

capturing respective test biometric samples of the persons when ones of the persons submit requests for one of training and authorization to process the telephone calls;

quantifying a difference between at least one authenticated biometric sample and the at least one a given test biometric sample obtained for a given request from one of the persons, including defining a first and at least a second threshold value for the difference between the authenticated biometric sample and the given test biometric sample; and dispositioning a first given request based on the difference, if the difference falls between the first threshold value and the at least second threshold value, by referring the first given request to a live supervisor and directing the at least one person to call a telephone number associated with the live supervisor; and dispositioning at least a second given request by sending an e-mail notification to the live supervisor, if the difference is more than the at least second threshold value.

2. The method of claim 1, wherein capturing at least one authenticated biometric sample includes capturing at least one of a speech sample, a palm print, a fingerprint, a retinal scan, an iris scan, and a facial scan.

3. The method of claim 1, wherein capturing the at least one authenticated biometric sample is performed when the at least one person submits an application for a position as a teleservices agent.

4. The method of claim 1, wherein capturing the at least one authenticated biometric sample includes capturing a first and at least a second authenticated biometric sample of the at least one person.

5. The method of claim 4, wherein capturing at least one authenticated biometric sample includes capturing the first authenticated biometric sample at the time of an initial human resources interview with the at least one person, and wherein capturing the at least second authenticated biometric sample is performed at a training session involving the at least one person.

6. The method of claim 1, wherein capturing at least one test biometric sample includes capturing at least one of a speech sample, a palm print, a fingerprint, a retinal scan, an iris scan, and a facial scan.

7. The method of claim 1, wherein capturing at least one test biometric sample is performed when the at least one person submits a request to access a computerized system to receive telephone calls processed by the computerized system.

8. The method of claim 1, wherein capturing at least one test biometric sample is performed during a log-on process during which a teleservices agent requests access to resources of a call center from a location remote from the call center.

9. The method of claim 1, wherein quantifying a difference between the at least one authenticated biometric sample and the at least one test biometric sample includes quantifying a difference between at least one of respective speech samples, palm print samples, fingerprint samples, retinal scan samples, iris scan samples, and facial scan samples.

10. The method of claim 1, wherein quantifying a difference includes defining at least a first threshold value for the difference between the authenticated biometric sample and the test biometric sample.

11. The method of claim 10, wherein dispositioning the request includes automatically approving the request if the difference is lower than the at least first threshold.

12. The method of claim 1, wherein referring the first given request includes sending a message listing at least a name of the at least one person.

13. The method of claim 1, further comprising dispositioning at least a third given request by automatically rejecting the third given request if the difference is more than the at least second threshold value.

14. The method of claim 1, wherein quantifying a difference is performed by a biometric sample authentication engine.

15. The method of claim 1, wherein quantifying a difference is performed by at least one of a speech recognition engine, a palm print recognition engine, a fingerprint recognition engine, a retinal scan recognition engine, an iris scan recognition engine, and a facial scan recognition engine.

16. The method of claim 1, further comprising obtaining at least one of image and video from the at least one person and providing the same to at least one caller who is interacting with the at least one person using call center resources.

17. Apparatus for minimizing fraudulent processing of telephone calls, the apparatus comprising at least the following:

means for capturing respective authenticated biometric samples corresponding to a plurality of respective persons;

means for capturing respective test biometric samples of the persons when ones of the persons submit requests for one of training and authorization to process the telephone calls;

means for quantifying a difference between at least one authenticated biometric sample and a given test biometric sample obtained for a given request from one of the persons, including defining a first and at least a second threshold value for the difference between the authenticated biometric sample and the given test biometric sample;

means for dispositioning a first given request based on the difference, if the difference falls between the first threshold value and the at least second threshold value, by referring the first given request to a live supervisor and directing the at least one person to call a telephone number associated with the live supervisor; and means for dispositioning at least a second given request by sending an e-mail notification to the live supervisor, if the difference is more than the at least second threshold value.

18. A program storage device readable by a machine, embodying a program of instructions executable by the machine to perform a method for minimizing fraudulent processing of telephone calls, the method comprising at least the following:

capturing respective authenticated biometric samples corresponding to a plurality of respective persons;

capturing respective test biometric samples of the persons when ones of the persons submit requests for one of training and authorization to process the telephone calls;

quantifying a difference between at least one authenticated biometric sample and a given test biometric sample obtained for a given request from one of the persons, including defining a first and at least a second threshold value for the difference between the authenticated biometric sample and the given test biometric sample; and dispositioning a first given request based on the difference, if the difference falls between the first threshold value and the at least second threshold value, by referring the a first given request to a live supervisor and directing the at least one person to call a telephone number associated with the live supervisor; and dispositioning at least a second given request by sending an e-mail notification to the live supervisor, if the difference is more than the at least second threshold value.

19. A call center adapted to minimize fraudulent access to call center resources, the call center comprising at least the following:
- a biometric capture device capturing respective test biometric samples from respective ones of a plurality of persons submitting requests to access call center resources;
- a data store management system receiving a test biometric sample and at least one agent identifier associated with a given person, and associating at least one authenticated biometric sample with the at least one agent identifier;
- a biometric sample comparator comparing the test biometric sample to the at least one authenticated biometric sample and generating a match level signal corresponding to a difference therebetween; and
- a program of instructions functioning at least in part to disposition requests received by respective persons based on the match level signal by:
- defining a first and at least a second threshold value for the match level signal,
    - if the match level signal falls between the first threshold value and the at least second threshold value for a given request, referring the given request to a live supervisor and directing the at least one person making the given request to call a telephone number associated with the live supervisor, and
    - if the match level signal is more than the at least second threshold value for the given request, dispositioning the given request by sending an e-mail notification to the live supervisor.

20. The call center of claim 19, wherein the test biometric sample is one of a speech sample, a palm print, a fingerprint, a retinal scan, an iris scan, and a facial scan.

21. The call center of claim 19, wherein the authenticated biometric sample is one of a speech sample, a palm print, a fingerprint, a retinal scan, an iris scan, and a facial scan.

22. The call center of claim 19, wherein the biometric capture device includes a camera adapted to capture the at least one test biometric sample.

23. The call center of claim 19, wherein the biometric capture device includes a camera adapted to capture the at least one authenticated biometric sample.

24. The call center of claim 19, wherein the biometric capture device is adapted to capture at least one of image and video of the at least one person, and to provide the same to at least one caller who is interacting with the at least one person using call center resources.

* * * * *